Patented Mar. 18, 1924.

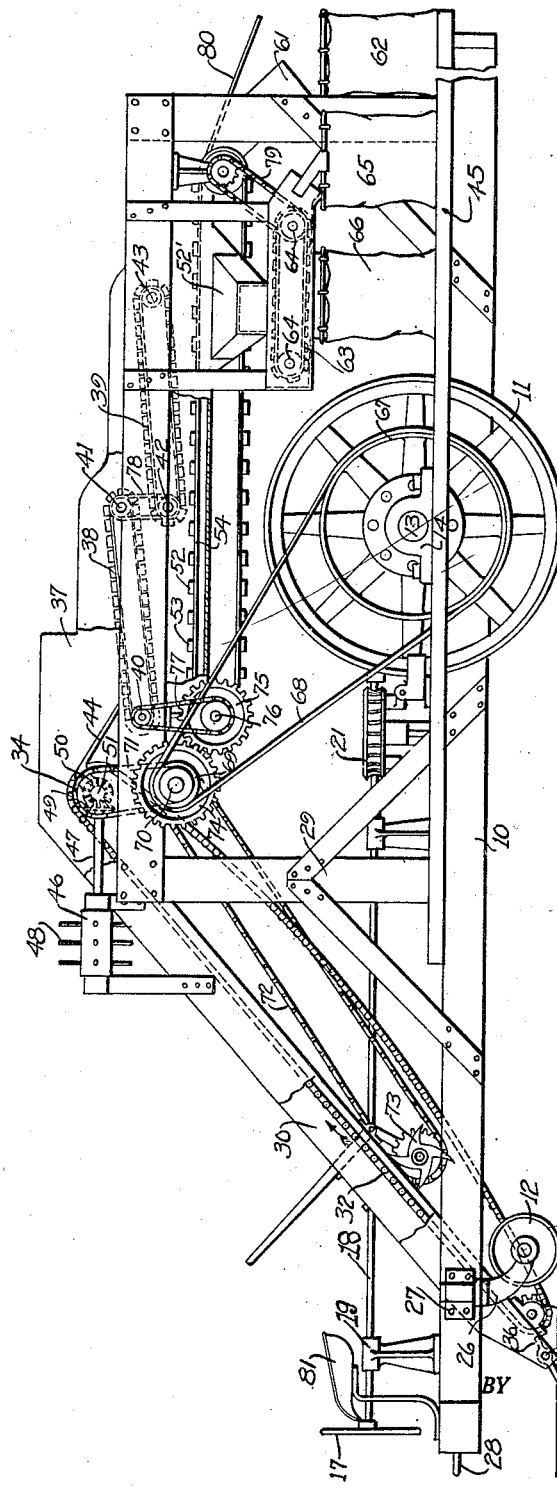

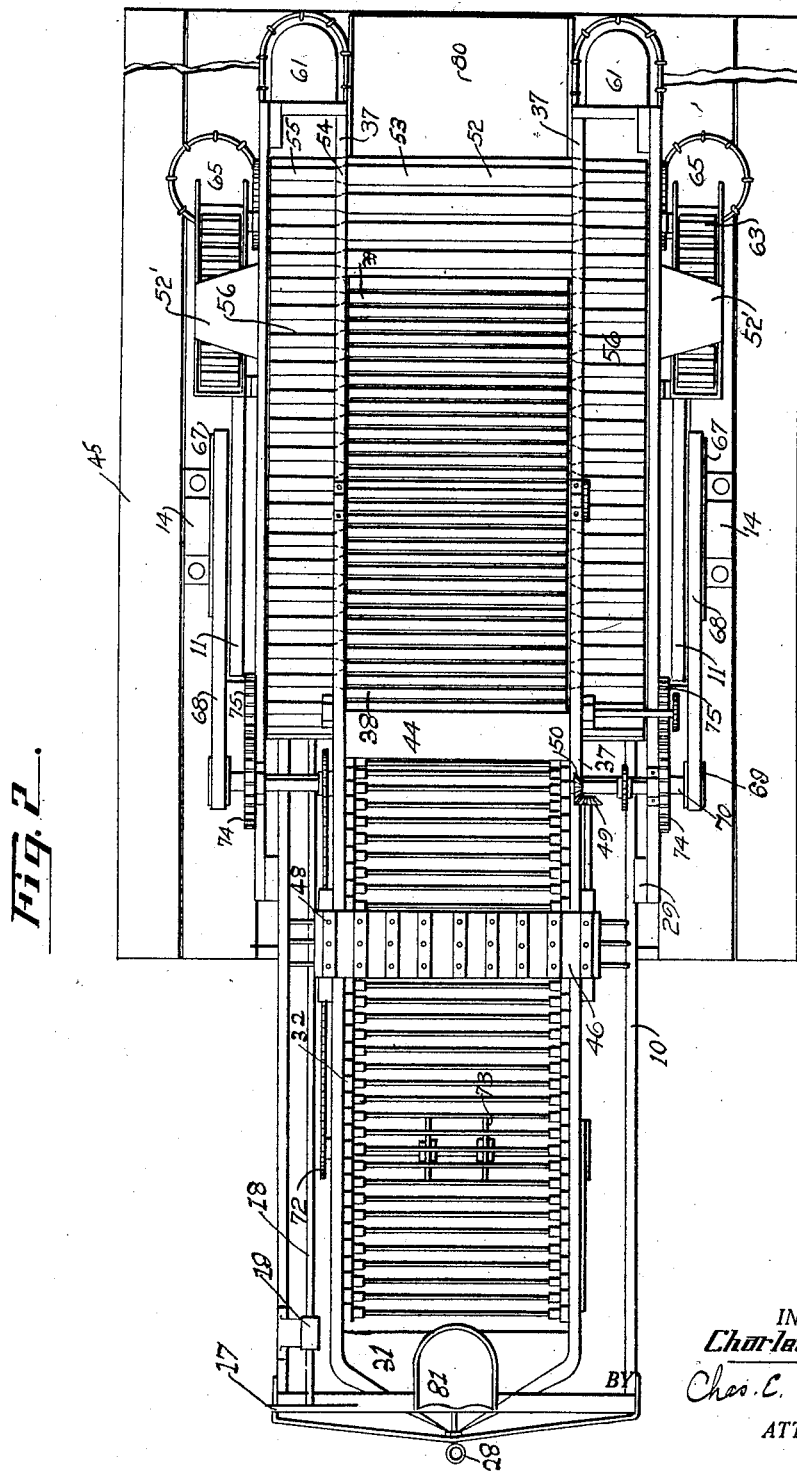

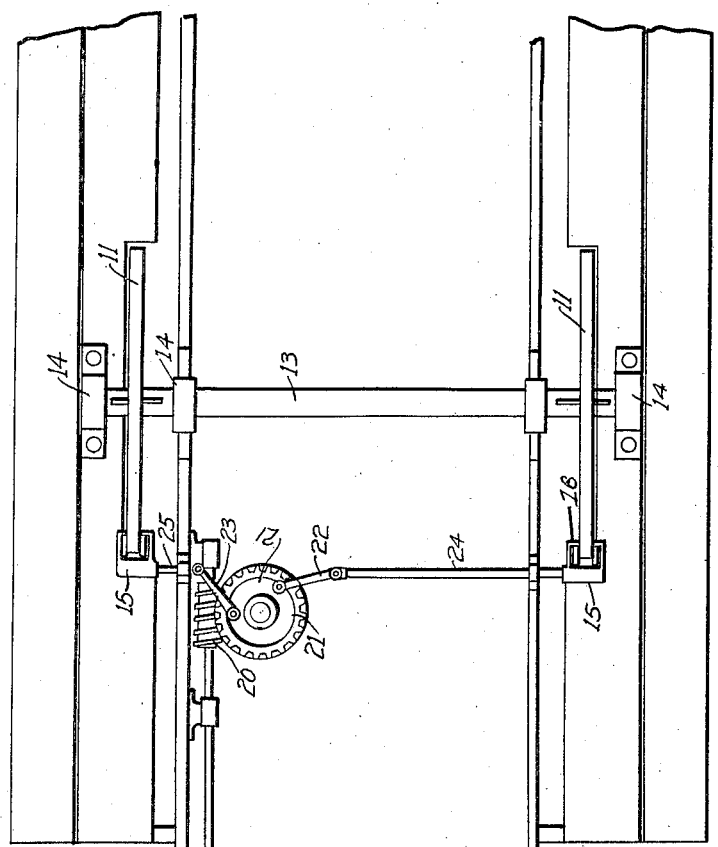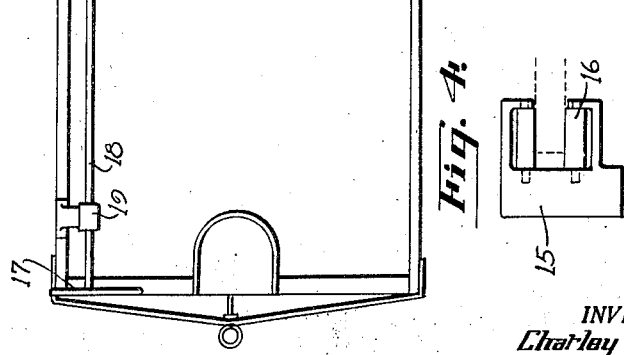

1,487,273

UNITED STATES PATENT OFFICE.

CHARLEY SANG, OF CASTROVILLE, CALIFORNIA.

POTATO HARVESTER.

Application filed August 18, 1920. Serial No. 404,301.

*To all whom it may concern:*

Be it known that I, CHARLEY SANG, a citizen of China, a resident of the United States, residing at Castroville, in the county of Monterey and State of California, have invented a new and useful Improvement in Potato Harvesters, of which the following is a specification.

This invention relates to an agricultural implement, and particularly pertains to means for harvesting potatoes.

It is the principal object of the present invention to provide improvements in machines for digging and harvesting potatoes, which machine embodies means whereby the grass and other vegetation may be separated from the soil carrying the potatoes and the soil turned on a picking table in such a manner as to most satisfactorily expose the potatoes, and permit them to be placed upon a sorting mechanism, by which various grades of potatoes will be segregated; the invention further embodying means whereby the running gear of the implement may be readily adjusted so that its wheels will travel between the rows of potatoes, irrespective of irregularities in the path of travel of a tractor by which the implement is drawn.

The invention contemplates the use of a main frame supported at its rear end by a pair of ground wheels carried on the opposite ends of a rigid axle, and at its forward end by caster wheels which permit the implement to be readily turned, said main frame carrying a series of elevator and conveying belts adapted to receive and carry soil thrown thereupon by a digging plate at the forward end of the machine, and over which belts the clods of dirt pass in a manner to permit potatoes or other similar vegetables to be readily picked therefrom and to be delivered to a suitable sorting mechanism; the machine being further provided with means for separating grass and other vegetation from the clods and also equipped with means for shifting the rear wheel of the vehicle to travel between the rows which were dug.

The invention is illustrated by way of example in the accompanying drawings, in which—

Figure 1 is a view in side elevation showing the present invention.

Fig. 2 is a view in plan further illustrating the arrangement of the parts of the invention, and particularly disclosing the elevating, conveying and sorting belts.

Fig. 3 is a fragmentary view in plan disclosing the manner in which the rear wheels are shifted to vary the path of travel of the vehicle.

Fig. 4 is an enlarged fragmentary view in plan illustrating one of the shifting members shown in Fig. 3.

Fig. 5 is a view in perspective showing one of the slats of the main sorting belt.

Referring more particularly to the drawings: 10 indicates a main frame, the rear end of which is supported by ground wheels 11, while the forward end is supported by a pair of caster wheels 12. The ground wheels are of considerable diameter and are splined to an axle 13. This axle is mounted in suitable bearings 14 upon the main frame 10, and is so arranged as to allow the ground wheels to slide longitudinally of the axle. This is brought about by mechanism more clearly shown in Fig. 3 of the drawings, and which comprises a pair of shifting forks 15, having parallel spaced rollers 16. These rollers extend along the opposite sides of the ground wheels and when shifted will tend to cramp the wheels and force them along the axle. Shifting is done by the manipulation of a handwheel 17 carried at the forward end of the main frame and secured to a shaft 18. This shaft is rotatably mounted in suitable bearings 19 and at its rear end carries a work gear 20. The gear 20 is in mesh with the worm wheel 21, to which are pivoted operating arms 22 and 23. The free ends of these arms are pivoted to thrust rods 24 and 25 respectively, which are in longitudinal alignment and are shifted horizontally by rotation of the worm gear 21. The shifting forks 15 are rigidly secured to the outer ends of the rods 24 and 25. The forward wheels 12 of the running gear are rotatably secured and pivotally mounted to the main frame by fork members 26 carried by bearings 27, secured to the main frame. It is understood that the implement is to be drawn by a suitable tractor connected by a drawbar to the bolt 28, and that as the tractor changes its course, the caster wheels will adapt themselves to the change in direction, while allowing the rear wheels 11 to turn as desired.

A super-structure 29 is mounted upon the main frame and this structure carries a series of elevator belts and conveyors. At the forward end of the super-structure an inclined runway 30 is secured. This runway extends beneath the forward end of the main frame 10 and carries a digging plate 31. This plate is preferably pointed, to more satisfactorily upturn the soil along a row of potatoes and to throw the soil and potatoes or other vegetable upwardly and on to the end of an elevator belt 32 which runs upwardly and forms the floor of the runway 30. This elevator belt may be constructed as desired and passes over a sprocket wheel 33 at the lower end of the runway, and another sprocket wheel 34 at the upper end of the runway.

The digging plate 31 is pivoted upon a pin 35 and is also formed with a rear extending portion 36, as shown in Fig. 1. This portion terminates near the conveyor chain 32, and it has been found possible for rocks and other solid material to wedge between the end of the plate and this chain in an objectionable manner. This is overcome by the pivot 35 in the present instance, which will permit the plowshare to swing clear of the chain and allow the obstructing object to fall into the furrow beneath the machine.

Side boards 37 are formed as continuations of the sides of the runway 30 and extend horizontally along the superstructure 29. Between these side boards conveyor belts 38 and 39 are positioned. It is to be noted that these belts are inclined and that they overlap each other. The belt 38 passes over a sprocket 40 at one end and a sprocket 41 at the other end. This last named sprocket is disposed in a higher horizontal plane than the sprocket 40, thus inclining the belt toward the rear of the machine for a purpose which will be hereafter described.

A sprocket 42, substantially below the sprocket 41, receives the forward end of belt 39, while a sprocket 43 is disposed at the rear of the frame for receiving the belt. This last named sprocket is also higher than the complementary sprocket 42 of the chain 39, thus inclining both belts in substantially parallel planes to the vertical. An inclined floor member 44 delivers the clods and vegetables to the belt 38. Due to the arrangement of the belts 38 and 39 in the manner shown, it is possible for the clods to be disintegrated and especially for them to be turned over as they pass along the machine and are subjected to the inspection of operators standing on the side running boards 45, these persons, of course, picking the desired product from the soil.

In order to facilitate the picking operation and to rid the elevated soil from all the vegetable matter possible, a cleaning belt 46 is mounted on shafts 47 and is disposed transversely of the runway 30. This belt carries a plurality of spring fingers 48 which continuously move across the top of the runway and tend to drag the clods and separate the grass and other such material therefrom, throwing the same to the side of the furrow. This mechanism is driven by a gear 49 in mesh with a gear 50, secured to the shaft 51 of sprocket 34.

Disposed beneath the conveying belts 38 and 39 is a moving sorting floor 52. This floor comprises a plurality of slats 53 secured to an endless carrier 54. The slats are arranged in spaced relation to each other and are of the general configuration shown in Fig. 5. Here it will be seen that each slat has a central wide portion and that the ends of the slats are narrowed, as indicated at 55. The wide portions of the slats occur between the side boards 37, while the narrow portions extend beneath the side boards and across sorting compartments 56. There is a sufficient space between the central portions of the slats to permit small clods and dirt to fall through the slats and on to the ground, while not being wide enough to allow the smaller sizes of potatoes to be lost. The spaces between the ends of the slats are sufficiently wide to allow all the potatoes other than the large size ones to pass between the slats, it being understood that the potatoes are deposited in the sorting compartments by the attendants, who pick them from the conveyor belts 38 and 39 and the end of the sorting floor 52. The potatoes are protected by a removable covering 57, detachably secured to the slats.

In order to vary the grading operation of the machine and to permit the sizes of the various potatoes to be selectively graded, moving plates 58 are slidably secured in transverse slots 59 of the end portions 55 of the slats 53. These plates are locked in position by clamping screws 60, it being understood that they may be moved to vary the spaces between the sides of the ends of the slats, and thus form restricting openings by which the grading of the vegetables will be produced.

The larger vegetables which are prevented from passing between the slats are held on the sorting floor and carried to end chutes 61, by which the potatoes are delivered to sacks 62. The potatoes which have passed through the sorting floor 52 will be received in hoppers 52' and will thereafter be delivered on to supplemental sorting conveyors 63. These conveyors are disposed in a horizontal plane and are led around sprockets 64. The slats of these conveyors are so spaced as to reject the larger vegetables and carry them to the end of the conveyors and into sacks 65, while allowing the smallest potatoes to fall between the slats and into sacks 66. In this manner three grades of potatoes will be obtained, as represented by the products in sacks 62, 65 and 66.

All of the conveyors and driven parts of the machine are operated by the advance of the implement and the rotation of its ground wheels 11. This rotation is imparted to the splined axle 13, which in turn operates a driving sprocket 67. This sprocket is fitted with a chain 68 leading to a driven sprocket 69 carried upon a counter shaft 70. The counter shaft is equipped with a plurality of sprockets, one of which drives a sprocket chain 71 and the elevator chain shaft 51; another drives a sprocket chain 72 and a vibrating mechanism 73 for the elevator chain. A gear 74 is secured on the counter shaft and in mesh with the gear 75 carried on a jack shaft 76. This shaft is equipped with suitable drums for driving the carriers 54 of the sorting floor 52, and also with a pulley through which a belt 77 is driven. This belt drives the sprocket 40 of the conveyor chain 38. Conveyor chain 39 is driven by a belt 78 connecting the shafts of sprockets 41 and 42. The auxiliary sorting belt 63 is driven by a sprocket chain 79, actuated by the movement of the carrier 54.

In operation of the present invention, the digging plate or plowshare 31 is properly selected and adjusted to meet the requirements of the conditions and the machine assembled as indicated in Fig. 1. As the machine is driven forward the digging member 31 will penetrate the ground and plow up the soil represented by a furrow of potatoes or other vegetables. As this soil banks up on the plate 31, it will be caught by the elevator chain 32 and carried by the runway 30 on to the floor 44, from which it will pass to the first conveyor belt 38. During this upward passage the cleaning teeth 48 of the belt 46 will act to rake off the grass and other foreign material and assist in insuring that the soil delivered to the conveyor belt 38 will be free from vegetable products which would retard the picking operation. As the clods pass along the inclined floor 44, they have a tendency to become disintegrated and turned over. This tendency is increased when the soil is transferred from the belt 38 to the belt 39, in which instance the soil will for the most part turn completely over and turn the upper, vegetable bearing side down while exposing the vegetables to be picked. This disturbance and agitation is further continued when the soil is delivered from the end of conveyor belt 39 on to the sorting floor 52. During the transit of the soil with the vegetables along the conveyor belts 38 and 39 and the sorting floor 52, the attendants pick out the potatoes. The fine dirt will fall through the conveyor belts, after which the free clods will pass out from the back of the machine along the floor 80. The vegetables will be deposited by the attendants into the compartments 56, where they will be carried, the larger ones passing through chutes 61 to the sacks 62, the remaining ones passing through chute 52′ to the secondary sorting belt 63, from which the larger sizes will be delivered to sacks 65 and the small potatoes, or cattle feed, to the sacks 66.

In the event that the tractor does not pursue a course of travel conforming to the potato rows, or that the potato rows are irregular, the driver situated on a seat 81 may operate the rear wheels 11 by the handwheel 17, and laterally shift these wheels on their axle 13, as desired.

It will thus be seen that the invention here disclosed comprises means for conveniently digging potatoes with their surrounding soil, thereafter treating the soil to most effectively expose the potatoes for picking, and at the same time afford means for mechanically grading the various sizes of the vegetables, all of which operation takes place as the implement advances along the row.

While I have shown the preferred form of my invention, it will be understood that various changes might be made in the combination, construction and arrangement of parts by those skilled in the art, without departing from the spirit of the invention as claimed.

Having thus described my invention, what I claim and desire to secure by Letters Patent is:

1. In a potato harvester, a wheeled frame, a super-structure thereon including parallel sorting compartments, the intermediate compartment being wider than the side compartments, a moving sorting floor for the compartments comprising spaced slats each having reduced ends, the intermediate wider portions of the slats operating under the intermediate compartment and the reduced end portions of the slats operating under the side compartments, the reduced end portions having transverse slots therein, plates adjustably mounted in said slots whereby to vary the size of the spaces between adjacent reduced ends of the slats, means for lifting potatoes onto the floor of the intermediate compartment, and means for agitating and turning the soil bearing the potatoes so that the potatoes are exposed.

2. In a potato harvester a wheeled frame, side by side sorting compartments arranged on the frame, a moving sorting floor for the compartments comprising spaced slats having reduced ends, the intermediate wider portions of the slats operating under the intermediate compartments and the reduced end portions of the slats operating under the side compartments, the reduced end portions having transverse slots therein, plates adjustably mounted in said slots whereby to vary the size of the spaces between adjacent reduced ends of the slats and means for lifting potatoes onto said floor.

3. In a potato harvester, a wheeled frame, side by side sorting compartments arranged on the frame, a moving sorting floor for the compartments comprising spaced slats having reduced ends, the intermediate wider portions of the slats operating under the intermediate compartments and the reduced end portions of the slats operating under the side compartments, the reduced end portions having transverse slots therein, plates adjustably mounted in said slots whereby to vary the size of the spaces between adjacent reduced ends of the slats, means for lifting potatoes onto said floor, and grading means operatively connected with one of said sorting compartments.

4. In a potato harvester, a wheeled frame, parallel sorting compartments arranged on the frame, a moving sorting floor for the compartments comprising spaced slats having reduced ends, the intermediate wider portions of the slats operating under the intermediate compartment and the reduced end portions of the slats operating under the side compartments, means adjustably connected to the slats to vary the size of the spaces between adjacent reduced ends of the slats and means for lifting potatoes onto said sorting floor.

5. In a potato harvester, a wheeled frame, a plurality of boards arranged in spaced relation to provide sides of a plurality of sorting compartments, a moving sorting floor for the compartments comprising spaced slats having reduced ends, the intermediate wider portions of the slats operating under the intermediate compartment and the reduced end portions of the slats operating under the side compartments, a covering for the wider intermediate portions of the slats, to protect the potatoes against bruising, means to vary the size of the spaces between adjacent reduced ends of the slats, and means for lifting potatoes onto the sorting floor.

6. In a potato harvester, a wheeled frame, a plurality of boards arranged in spaced relation to provide sides of a plurality of sorting compartments, a moving sorting floor for the compartments comprising spaced slats having reduced ends, the intermediate wider portions of the slats operating under the intermediate compartment and the reduced end portions of the slats operating under the side compartments, a covering for the wider intermediate portions of the slats, to protect the potatoes against bruising, means to vary the size of the spaces between adjacent reduced ends of the slats, means for lifting potatoes onto the sorting floor, means for agitating and turning the soil bearing the potatoes so that the potatoes are exposed, and means for conveying potatoes from the several compartments.

7. In a potato harvester, a wheeled frame, a plurality of side by side compartments arranged on the frame, a moving sorting floor for the compartments comprising spaced slats, each slat having a reduced portion, a device connected to each slat adjacent the reduced portion so as to reduce the size of the opening formed by the reduced portion, and means for lifting potatoes onto said floor.

In testimony whereof I have hereunto set my hand in the presence of two subscribing witnesses.

CHARLEY SANG.

Witnesses:
Thos. Renison,
G. G. Baker.